April 8, 1941. W. A. RAY Re. 21,767

SOLENOID

Original Filed Oct. 13, 1936

INVENTOR.
William A. Ray
BY Robert H. Eckhoff
ATTORNEY

Reissued Apr. 8, 1941 Re. 21,767

UNITED STATES PATENT OFFICE 21,767

SOLENOID

William A. Ray, Glendale, Calif., assignor to General Controls Company, a corporation of California Original No. 2,098,196, dated November 2, 1937, Serial No. 105,400, October 13, 1936. Application for reissue August 5, 1938, Serial No. 223,297

4 Claims. (Cl. 175—338)

This invention relates to an improved construction for an electro-magnetic operator, commonly termed a solenoid. The present invention relates to improvements in the construction of those devices generally disclosed by me in my applications Serial No. 635,886 filed October 3, 1932, now Patent No. 2,096,763 of October 26, 1937, and Serial No. 92,748 filed July 27, 1936, now Patent No. 2,098,195 of November 2, 1937.

In the construction and manufacture of a suitable electro-magnetic operator for use upon alternating current, I have experienced considerable difficulty in ridding the device of humming. For example, in assembling the control device disclosed in my Patent No. 2,046,882, of July 7, 1936, it was found that some two to four hours time was necessary to assemble the solenoid valve 29 in the structure shown in said patent to ensure that the solenoid would be free from hum. This assembly time for this single unit raised the assembly cost for the valve structure of said patent beyond all practical reason.

After considerable investigation into the cause of the humming and after many trials in an attempt to overcome this undesirable characteristic, I have at least found a construction which obviates the humming, enabling the electro-magnetic operator to be assembled as rapidly as an assembly mechanic can put the proper parts together. This has enabled the assembly of the aforementioned valve of my patent to be made with much greater ease, since the time required in connection with the magnetic operator 29 is a matter of minutes, as compared to hours.

Briefly summarizing the results of my investigation into the causes of humming, it was my finding that humming was due to transverse displacement of one end of the solenoid plunger. This occurred even though the other end of the plunger was fixed against such transverse movement and even though all parts of the electro-magnetic operator, including the washers, plunger and associated metal parts were carefully machined to tolerances so restricted as to be impractical in commercial production.

I found that it was necessary to keep the plunger axially aligned in the magnetic center of the axial passage through the coil of the electro-magnetic operator. This centering I accomplished in a very simple manner, as will presently appear hereinafter, wherein I have disclosed the preferred construction embodying the discovery of this invention.

It is in general the broad object of the present invention to improve upon the construction of an electro-magnetic operator to the end that humming of said operator, when utilized in conjunction with alternating current, is eliminated.

A further object of the present invention is to provide an improved solenoid construction enabling an effective electro-magnetic operator to be constructed by commercial manufacture to provide a cheap, readily assembled and yet satisfactory operator.

The invention includes other objects and features of advantage, some of which, together with the foregoing, will appear hereinafter, wherein the present preferred construction of this invention is set forth.

In the drawing accompanying and forming a part hereof:

Figure 1:
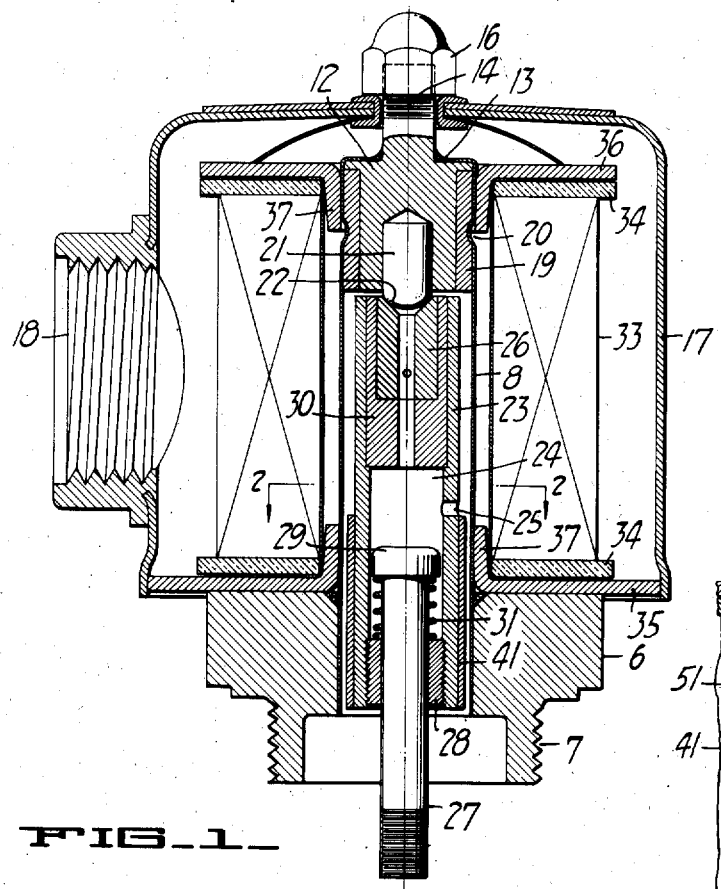
Figure 1 is a section taken through a solenoid structure including the present preferred construction.
Figure 2:
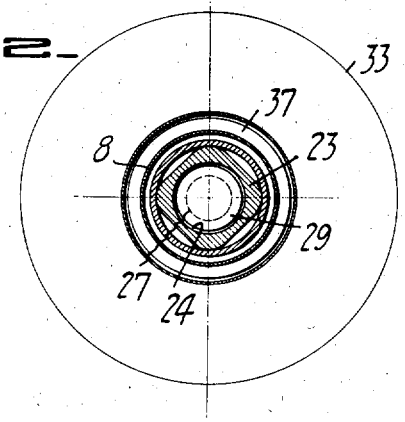
Figure 2 is a cross section through the structure of Figure 1.

The actuator of the present invention is provided with a base 6 having a threaded extension 7 so that the actuator can be suitably attached to a housing, such as that including a valve or other device to be operated. A non-magnetic tube 8 of brass, Monel or the like is secured to the base 6. An insert 12 is secured as at 13 to the tube, the insert including an extension 14 threaded to receive a nut 16. A suitable housing, generally indicated at 17, is mounted upon and is secured in place upon the threaded extension 14 by means of the nut, this housing including an inlet 18 for attachment of a conduit including lead-in wires.

The insert 12 is made of non-magnetic material, but carries a ring 19 of magnetic material. This ring is grooved as at 20 and the tube 8 is rolled in to fit this groove and to retain the magnetic ring in place. An insert 21 of magnetic material is carried on the insert 12, the insert 21 projecting beyond the insert 12 and being formed at 22 to center the solenoid plunger generally indicated by numeral 24. The solenoid plunger is a composite structure, including an outer magnetic shell 23 or primary core approximating in size the ring 19. Mounted within and adjacent the upper end is a non-magnetic plug 30 providing a shading ring. Inserted within this plug is a magnetic plug 26 providing a secondary core. The magnetic plug 26 and non-magnetic plug 30 are concentrically apertured longitudinally to release any fluid that might be trapped between the plunger and the stop. In addition, the shell 23 is apertured as at 25.

Slidably mounted in the bottom portion of the solenoid is a stud 27. This stud is retained in place by a sleeve 28 of magnetic material screwed into the bottom of the sleeve 23. Stud 27 has a head 29 thereon against which rests a light spring 31. This spring urges stud 27 upwardly to permit the plunger to rise before it begins to lift stud 27 and the structure attached thereto, for example, a valve.

The electromotive force is supplied by a coil 33 formed upon a spool 34. The spool 34 is positioned between magnetic washers 35 and 36, these washers being mounted upon and including angular portions 37 extending along the tube 8.

In operation, the current flow through the coil reaches a maximum flow at the peak of the sine wave, and a minimum or zero flow at the end of each half cycle. Actually, there is a large flow of current provided in one direction for a fraction of a second, followed by cessation of current flow when the half cycle changes or the current reverses. The present invention enables an effective force to be maintained upon the solenoid plunger at all times and even though the current for an instant is zero and subsequently reverses. This substantially constant flux flow to the plunger enables the humming noise to be overcome.

It is the discovery of the present invention that the humming noise is due to vibration of the solenoid plunger, particularly in that region adjacent the stud 27. Since the plunger is positioned at the other end by engagement of parts 22 and 26, I have found that by placing a ring 41 of non-magnetic material, such as copper, brass, or dural, around the base of the solenoid plunger, the humming can be obviated. This I attribute to the shielding effect, on the base of the plunger, from the adjacent lines of flux from the washer 35 and its portion 37.

It is very difficult to manufacture an electromagnetic operator of the type herein dealt with which is symmetrical about the solenoid plunger axis. For example, any slight excess thickness in one side of angular portion 37 will result in a greater flow of magnetic lines of force from that side than from the opposite side. As a consequence, the solenoid plunger attempts to position itself in the magnetic center. However, since the device is being operated upon alternating current, the flux lines are constantly changing, with the result that the plunger is always attempting to follow this change and take up a new position. By providing the ring 41 about the base of the plunger, the inequalities are more or less equalized, so that such careful attention to super-accurate machining is not necessary. As a matter of fact, I have found that super-accurate machining without the present invention and the structure evolved thereby was not sufficient, for solenoid operators manufactured under the most careful machining and super-tolerances were extremely disappointing in that they hummed just as loudly as those taken from the commercial assembly line.

The present invention therefore enables a relatively cheap and inexpensive electro-magnetic operator to be provided. For example, it enables me to successfully utilize a square type of solenoid plunger inside of the round guide tube 8, to avoid a dash pot effect and to enable the plunger to rise quickly. The ring 41 is merely slipped over the plunger and secured thereto as by spreading the end of the plunger slightly, or by otherwise securing the ring securely on the plunger.

Figure 3:
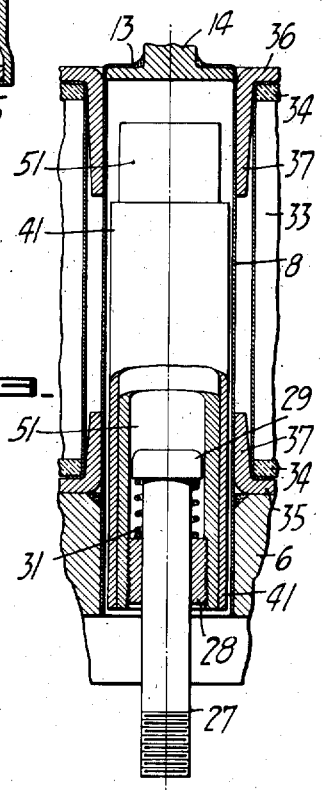
Figure 3 is a cross section through a solenoid in which the solenoid plunger floats.

The invention is also applicable to solenoids as in Figure 3 wherein the plunger 51 floats freely. The insert 12 is cut off so the plunger is limited in its rise by the spring 31 and stud 27. The portion 37 on the upper washer extends down slightly more than in Figure 1 to ensure flux flow to lift the plunger 51 which is made as light in weight as is possible. The ring 41 is positioned about the plunger base.

It is of course readily apparent to those skilled in the art that various modifications can be made without departing from the scope of the appended claims.

I claim:

1. In an alternating current solenoid, a coil having a passage therethrough, magnetic washers at either end of said coil, a solenoid plunger movable through said passage axially upon energization of said coil into engagement with stop means positioned at one end of said passage to align that end of the plunger in a definite single position axially of said passage, said plunger including an inner magnetic member encased at least partially by a non-magnetic member and an outer magnetic member extending substantially between said washers when said plunger engages said stop, said members being fixedly joined together into a single unit movable as such, said inner magnetic member engaging said stop means, and a non-magnetic sleeve carried by the plunger and positioned thereon to distribute more evenly flux from one of said washers adjacent the other end of the plunger and maintain said other plunger end in a single position in said passage whereby humming is absent.

2. In an alternating current solenoid, an electro-magnetic coil having a passage therethrough, magnetic means providing a magnetic path portion of low reluctance about the ends and outside of said coil, a free solenoid core of magnetic material movable in said passage and cooperating with the aforesaid magnetic means to provide a complete first flux path for flow of flux upon energization of said coil, a stop of magnetic material positioned at one end of said passage and engaged by said core upon energization of said core, said core and said stop having magnetic end portions providing a cooperating tapered projection and a like tapered recess directly engaging to guide and center and retain the core in a fixed location at said one passage end only during energization of said coil, shading coil means at said one passage end displacing flux flowing through said tapered projection and recess to provide a second magnetic path through said stop and core out of phase with the flux traversing said first path during coil energization, means effective to isolate magnetically at least one of said tapered end portions from said first flux path and limit flow through said end portions of residual flux from said first path when said coil is deenergized whereby sticking of said core against said stop is obviated upon deenergization of said coil, and a non-magnetic sleeve carried by the core adjacent the other passage end to distribute more evenly flux passing to said core at said other passage end from said magnetic means and maintain said core in a single position in said passage whereby humming is absent when the coil is energized and the core is against said stop.

3. In an alternating current solenoid, an electro-magnetic coil having a passage therethrough, magnetic means providing a magnetic path portion of low reluctance about the ends and outside of said coil, a free solenoid core of magnetic material movable in said passage and cooperating with the aforesaid magnetic means to provide a complete first flux path for flow of flux upon energization of said coil, a stop of magnetic material positioned at one end of said passage and engaged by said core upon energization of said core, said core and said stop having magnetic end portions providing a cooperating tapered projection and a like tapered recess directly engaging to guide and center and retain the core in a fixed location at said one passage end only during energization of said coil, said tapered projection and recess each being relatively small in total cross-sectional area as compared to the cross-sectional area of said core, said recess being relatively shallow as compared to the length of said core, shading coil means at said one passage end displacing flux flowing through said tapered projection and recess to provide a second magnetic path through said stop and core out of phase with the flux traversing said first path during coil energization, means effective to isolate magnetically at least one of said tapered end portions from said first flux path and limit flow through said end portions of residual flux from said first path when said coil is deenergized whereby sticking of said core against said stop is obviated upon deenergization of said coil, and a non-magnetic sleeve carried by the core adjacent the other passage end to distribute more evenly flux passing to said core at said other passage end from said magnetic means and maintain said core in a single position in said passage whereby humming is absent when the coil is energized and the core is against said stop.

4. An alternating current solenoid comprising a current carrying coil having an axial passage therethrough, a unitary structurally integral magnetic plunger disposed within said passage and attracted to a raised position by the flow of an alternating current in the coil and released to a lower position upon cessation of the alternating current, and fixed means for carrying an alternating magnetic flux and transmitting the same to the ends of the plunger said means comprising a magnetic stop at the top of the passage, said stop and upper end of the plunger having, as anti-humming means, shading coil means and complementary nesting surfaces; said fixed means further comprising an annular magnetic member at the lower end of the coil surrounding the lower end portion of the plunger, separated from the plunger by an annular air gap and conducting an alternating magnetic flux to the plunger in a direction generally radial of the plunger axis, and, as anti-humming means at the lower end of the plunger, a nonmagetic conducting cylinder interposed in said air gap and carried by the lower end of the plunger and forming a closed electric circuit of low resistance in paths around the flux and distributing the flux substantially to eliminate humming thereat.

WILLIAM A. RAY.